US006269736B1

(12) United States Patent
Melton

(10) Patent No.: US 6,269,736 B1
(45) Date of Patent: Aug. 7, 2001

(54) INFUSER FILTER FOR MAKING BEVERAGES

(75) Inventor: Bruce W. Melton, Hinsdale, IL (US)

(73) Assignee: Espire Incorporated, Chicago, IL (US)

( * ) Notice: Subject to any disclaimer, the term of this patent is extended or adjusted under 35 U.S.C. 154(b) by 0 days.

(21) Appl. No.: 09/520,523

(22) Filed: Mar. 8, 2000

Related U.S. Application Data

(63) Continuation of application No. 08/989,473, filed on Dec. 12, 1997, now Pat. No. 5,913,964, which is a continuation-in-part of application No. 08/766,978, filed on Dec. 16, 1996, now Pat. No. 5,775,205.
(60) Provisional application No. 60/123,517, filed on Mar. 8, 1999.

(51) Int. Cl.$^7$ .............................. A47J 31/00; A47G 19/14
(52) U.S. Cl. ................................ 99/322; 99/279; 99/323
(58) Field of Search ............................. 99/322, 323, 316, 99/319, 279; 220/521, 713, 501, 371, 372; 210/314, 474, 475, 476, 495

(56) References Cited

U.S. PATENT DOCUMENTS

| D. 282,615 | 2/1986 | Levine ........................................ D7/9 |
| D. 358,294 | 5/1995 | Letica ..................................... D7/392.1 |
| D. 367,816 | 3/1996 | Cai ........................................... D9/430 |
| 370,141 | 9/1887 | Hobbs . |
| 1,777,909 | 10/1930 | Brookes . |
| 2,093,980 | 9/1937 | Linger ........................................ 53/3 |
| 3,446,624 | 5/1969 | Luedtke ........................................ 99/7 |
| 3,566,770 | 3/1971 | Crossley .................................... 99/289 |
| 3,579,351 | 5/1971 | Wege et al. .............................. 99/77.1 |
| 3,631,793 | 1/1972 | Bednartz .................................. 99/295 |
| 3,665,841 | 5/1972 | Hardy et al. ............................. 99/281 |
| 3,724,359 | 4/1973 | Masters et al. ......................... 99/281 |
| 3,797,642 | 3/1974 | Dobry et al. ............................ 206/0.5 |
| 3,809,215 | 5/1974 | Dobry ..................................... 206/0.5 |
| 3,861,284 | 1/1975 | Costello .................................. 99/321 |
| 3,870,220 | 3/1975 | Kour et al. .............................. 229/1.5 |
| 3,895,118 | 7/1975 | Rambold ................................. 426/83 |
| 3,899,599 | 8/1975 | Rambold ................................. 426/82 |
| 3,935,318 | 1/1976 | Mihailide ............................... 426/80 |
| 4,074,827 | 2/1978 | Labe, III ................................ 220/23 |
| 4,141,462 | 2/1979 | Rucci ..................................... 220/254 |
| 4,141,997 | 2/1979 | Syroka et al. .......................... 426/79 |
| 4,211,156 | 7/1980 | Zimmermann ......................... 99/287 |
| 4,278,691 | 7/1981 | Donarumma et al. ................. 426/80 |
| 4,333,583 | 6/1982 | Montemarano ...................... 220/90.4 |
| 4,345,512 | 8/1982 | Moore .................................... 99/323 |
| 4,443,481 | 4/1984 | Donarumma et al. ................. 426/82 |
| 4,478,346 | 10/1984 | Spong ................................. 220/90.2 |
| 4,487,114 | 12/1984 | Abdenour .............................. 99/295 |
| 4,503,992 | 3/1985 | Sitko et al. .......................... 220/90.4 |
| 4,520,716 | 6/1985 | Hayes ..................................... 99/306 |

(List continued on next page.)

FOREIGN PATENT DOCUMENTS

| 91 14 707 | 4/1992 | (DE) . |
| 637845 | 5/1928 | (FR) . |
| 18416 | of 1889 | (GB) . |
| WO 93 03973 | 3/1993 | (WO) . |

*Primary Examiner*—Reginald L. Alexander
(74) *Attorney, Agent, or Firm*—Sidley & Austin; Hugh A. Abrams

(57) ABSTRACT

A disposable infuser for brewing beverages within an associated container. The infuser includes a centrally located well portion for receiving a charge of particulate flavoring material, like tea leaves. The well includes a filter portion which has a plurality of openings. The openings are formed without scrap "flash" or waste by shearing a tab or flap of material away from the filter portion of the well or piercing the filter portion of the well with a needle-shaped or knife-shaped protrusion in the mold. The resulting tabs or punctures serve to keep the particulate flavoring material out of the brewed beverage.

5 Claims, 3 Drawing Sheets

U.S. PATENT DOCUMENTS

| | | | |
|---|---|---|---|
| 4,577,080 | 3/1986 | Grossman | 219/10.5 |
| 4,589,569 | 5/1986 | Clements | 220/380 |
| 4,602,557 | 7/1986 | Yip | 99/279 |
| 4,605,123 | 8/1986 | Goodrum et al. | 206/0.5 |
| 4,629,088 | 12/1986 | Durgin | 220/254 |
| 4,688,479 | 8/1987 | Cunningham | 100/133 |
| 4,697,503 | 10/1987 | Okabe et al. | 99/306 |
| 4,735,810 | 4/1988 | Dacal | 426/80 |
| 4,739,898 | 4/1988 | Brown | 220/203 |
| 4,785,723 | 11/1988 | Sheen | 99/279 |
| 4,821,630 | 4/1989 | Roberts | 99/323 |
| 4,864,921 | 9/1989 | Ross | 99/279 |
| 4,867,993 | 9/1989 | Nordskog | 426/77 |
| 4,875,574 | 10/1989 | Travers | 206/0.5 |
| 4,924,922 | 5/1990 | Johnson | 141/346 |
| 4,938,375 | 7/1990 | Fantacone | 220/90.4 |
| 4,997,015 | 3/1991 | Johnson | 141/346 |
| 5,036,755 | 8/1991 | Abdenour | 99/306 |
| 5,038,959 | 8/1991 | Patel | 220/366 |
| 5,168,140 | 12/1992 | Welker | 219/10.5 |
| 5,183,172 | 2/1993 | Boller | 220/270 |
| 5,197,624 | 3/1993 | Dodaro | 220/254 |
| 5,253,781 | 10/1993 | Van Melle et al. | 220/713 |
| 5,312,637 | 5/1994 | Midden | 426/433 |
| 5,363,745 | 11/1994 | Lin | 99/306 |
| 5,379,914 | 1/1995 | Martins | 220/719 |
| 5,398,843 | 3/1995 | Warden et al. | 220/711 |
| 5,402,904 | 4/1995 | Close | 220/254 |
| 5,424,083 | 6/1995 | Lozito | 426/82 |
| 5,460,286 | 10/1995 | Rush et al. | 220/306 |
| 5,477,979 | 12/1995 | Goessling et al. | 220/713 |
| 5,480,054 | 1/1996 | Midden | 220/202 |
| 5,497,917 | 3/1996 | Krimmel et al. | 222/475 |
| 5,509,568 | 4/1996 | Warden et al. | 220/711 |
| 5,529,179 | 6/1996 | Hanson | 206/219 |
| 5,531,347 | 7/1996 | Goulding | 220/256 |
| 5,545,879 | 8/1996 | Brotz | 219/689 |
| 5,609,194 | 3/1997 | Link et al. | 141/331 |
| 5,613,616 | 3/1997 | Monus | 220/791 |
| 5,613,619 | 3/1997 | Van Melle | 220/712 |
| 5,620,724 | 4/1997 | Adler | 426/77 |
| 5,635,229 | 6/1997 | Ray | 426/112 |
| 5,644,972 | 7/1997 | Dahmen et al. | 99/280 |
| 5,653,362 | 8/1997 | Patel | 222/156 |
| 5,657,898 | 8/1997 | Portman et al. | 220/712 |
| 5,678,472 | 10/1997 | Millman | 99/279 |

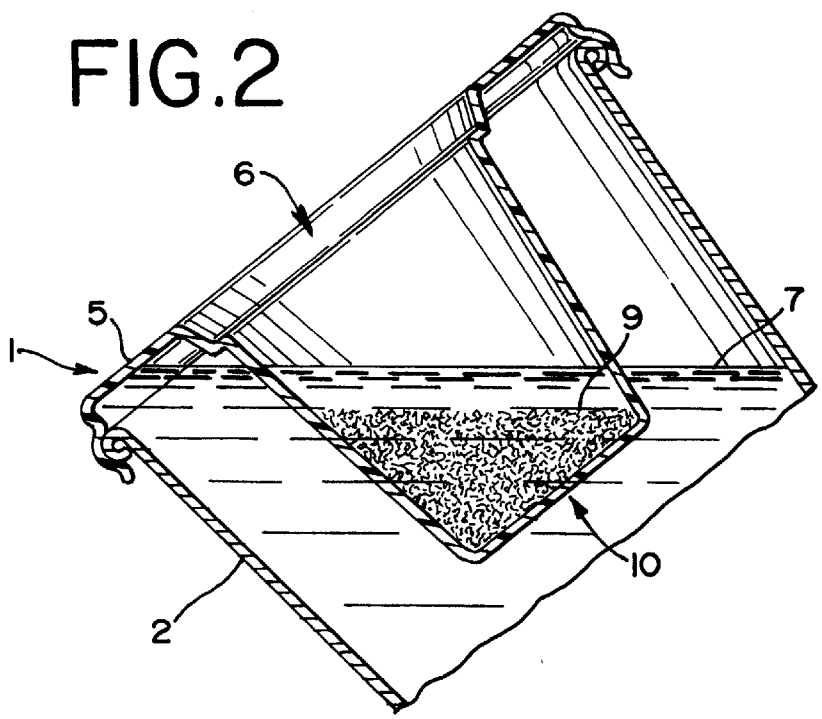
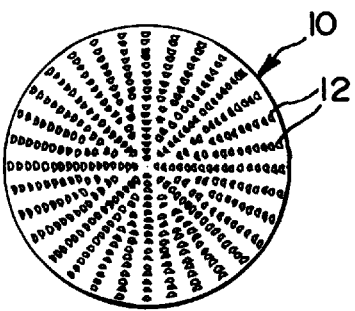
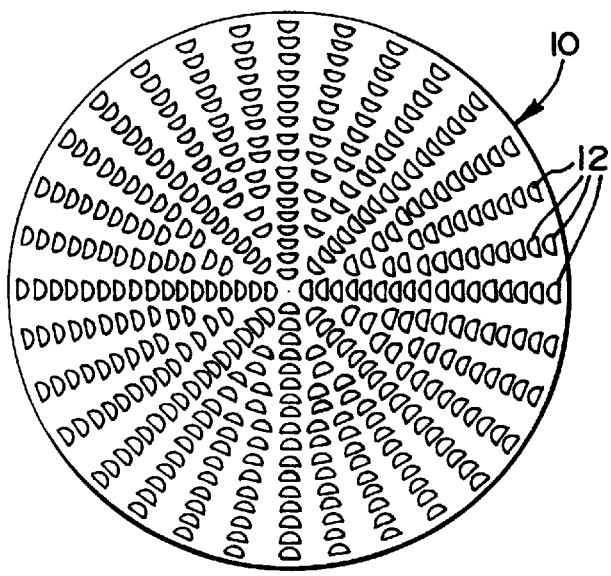

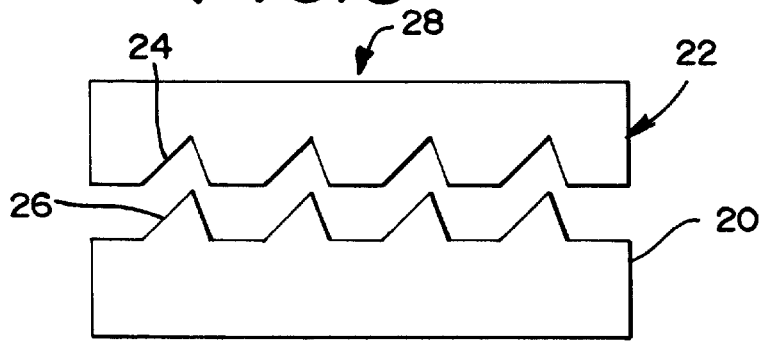
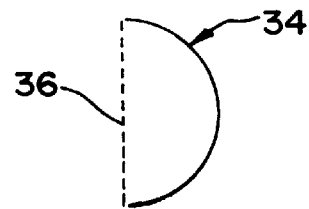
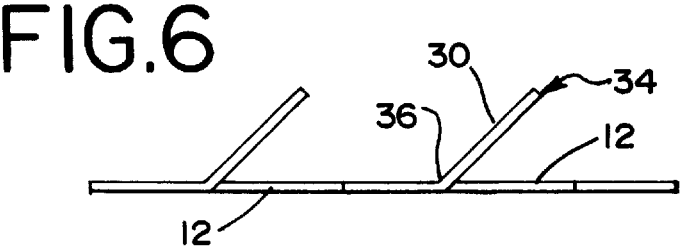
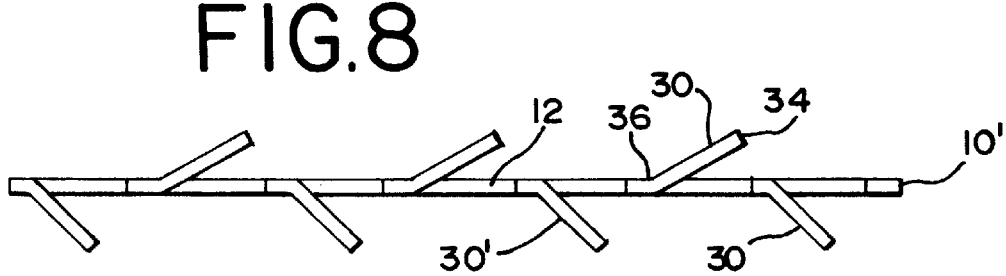
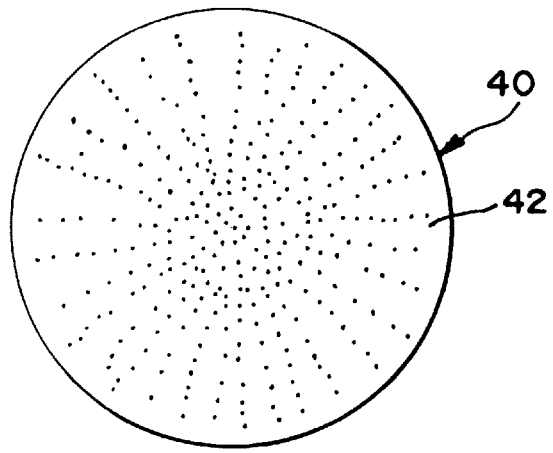

INFUSER FILTER FOR MAKING BEVERAGES

This application claims benefit of provisional application U.S. Ser. No. 60/123,517 filed Mar. 8, 1999. This application is a continuation U.S. patent application Ser. No. 08/989,473, filed Dec. 12, 1997, now issued as U.S. Pat. No. 5,913,964 which is a continuation in part of U.S. patent application Ser. No. 08/766,978, filed Dec. 16, 1996 now U.S. Pat. No. 5,775,205 by reference herein.

BACKGROUND OF THE INVENTION

The present invention relates generally to tea making and dispensing, and more particularly to an infuser for making tea, "herbal teas," coffees, flavored coffees and teas, and other steeped beverages. The infuser provides improved performance, convenience and other advantages in use, and is preferably a low-cost, disposable unit.

In recent years, there has been a rapid upsurge of interest in so-called gourmet coffee beverages. The numerous flavors and varieties of coffees have been heavily advertised and promoted. The public has become acquainted with specialty coffee shops serving a large variety of these products. Many so-called premium coffee shops receive high prices for their products, whether sold for on-premises or off-premises consumption.

Owing in part to the increasing saturation of the "gourmet" coffee market, and in response to a perceived need for lower-caffeine "healthy" beverages, there has been a growing interest in the consumption of teas and "herbal teas" (also known as "tisanes" and "infusions") in the United States. Worldwide, teas have a much longer tradition of acceptance than coffee and are consumed on a very widespread basis.

While tea brewing and consumption differ from coffee brewing and consumption in several important respects, the products and methods in other respects present similar problems, many of which are overcome by the present invention.

Prior to the advent of the tea bag, tea was customarily prepared by placing tea leaves in a pot, over which leaves near-boiling water was poured and steeped until a beverage of the desired strength was reached. In order to avoid the buildup of bitterness or other undesirable flavor, it was known to provide screens or strainers whereby the tea leaves could be confined for removal at a desired point in the brewing cycle. The use of strainers and the like, however, has the drawback of being relatively clumsy and inefficient from an equipment standpoint. Strainers require frequent cleaning and require the user to remove the strainer when the desired strength of beverage has been achieved. Strainers are also difficult to fill, seal, and to remove and store without dripping. Strainers are also often too small to allow sufficient circulation of water, particularly when using the highest quality "full leaf" teas.

While the tea bag addresses certain of the disadvantages with straining equipment, it too, has many disadvantages. Most bagged tea is of low quality, and the process of placing tea leaves in bags involves the crushing and breaking of the leaves, to the considerable detriment of flavor. The relatively small size and fine texture of the tea bag restricts the circulation of the leaves in the hot water, inhibiting rapid and full diffusion of the flavors into the body of the liquid. In addition, used tea bags, like the aforementioned strainers, create removal and disposal problems, particularly when the beverage is sold "to go" or on a "carry out" basis.

Another disadvantage of the tea bag is that it typically is available in one or two sizes only, effectively predetermining beverage strength for "carry out" products. Tea beverage strength is often varied by adjusting the proportion of water added to the leaves. However, for on-premises brewing of tea that is to be sold "to go," cup sizes are generally standardized and, consequently, strength variation is not easily achieved where the size of the tea bag is fixed.

Bagging tea also adds significant cost to the price of the beverage. Commonly, tea is enclosed in a bag (often, with an attached string and tab to facilitate removal); the bag is in turn placed in a paper or foil envelope or sleeve, and then the envelope or sleeve is placed in a box. The cost of these steps and/or materials is substantial. Moreover, tea bags are far more bulky per serving than "loose" teas, thereby increasing the costs of shipping, storing, and serving tea to consumers.

Another significant economic drawback of "bagging" tea is the cost of buying, maintaining, and operating expensive and specialized bagging equipment. Tea "co-packers" typically require minimum "run" quantities for a particular bag filling of 100,000 bags or more. A vendor's ability to commit to a wide variety of flavors in these quantities is considered prohibitively costly for all but the most established companies. Another difficulty with "co-packing" tea bags arises from the large scale, mass production aspect of such bagging: there can be considerable delays in scheduling and completing production runs. Obviously, passing tea ingredients—many of which are imported— through middlemen such as co-packers and their distributors adds to the cost of the product, and the inherent delay may also compromise freshness and flavor.

Many tea drinkers are also acutely aware of environmental problems and, for such consumers, there is a negative reaction to bleached papers that are often used in tea bags. Moreover, the use of strings and staples to facilitate the removal of the bag at the desired point in the brewing cycle creates problems in the disposition of such products, including separating them from waste streams. "Stringless" tea bags are designed to address this problem, but they are clumsy for servers, who should, for sanitary reasons, use tongs to place the bag in a cup. Stringless bags also subject the user to certain risks and inconveniences in removing the bag at the desired point in the brewing cycle: often, stringless bags are plucked out of the hot tea with the user's bare fingers.

The foregoing disadvantages associated with tea bags are exacerbated when the beverage is sold "to go." The bag must be removed from the beverage between three and five minutes after purchase, typically too long to wait at the retail establishment and too soon before an appropriate receptacle for the dripping bag is located. Moreover, using a tea bag in a cup having a removable lid requires the user to open the lid in order to remove the bag, unless some sort of cumbersome bag receptacle is incorporated into the lid. The high temperature of the water creates a risk of injury if the cup is spilled while trying to remove the lid.

The foregoing aspects of the prior art practices argue strongly for using brewing methods other than those involving tea bags. However, the use of auxiliary equipment, including strainers, also creates difficulties in addition to the requirement that the equipment be manipulated after brewing and is hence unsuitable for takeout operations.

Referring now to the characteristics and advantages of bulk, "loose" tea as far as potential customer satisfaction and retailing profit are concerned, bulk tea is almost invariably perceived to be of higher quality than bagged tea. Bulk tea also requires less space per serving than bagged teas, for which allowance must be given for the waste space within the bag, and for the envelopes, sleeves, or boxes. Bulk tea is much more easily shipped and stored, and holds out the potential for saving a great amount of beverage preparation counter space. In order to serve a popular market successfully, it is believed that a vendor should be able to offer at least three to four varieties of black tea, several varieties of green tea, a significant number of herbal teas and a number of flavoring enhancers or additives. These aggregate at least 10 to 20 varieties of teas and flavoring products, all of which are available at lower cost in bulk, "loose" form and which can be shipped and stored in much smaller containers. Moreover, bulk tea containers, such as jars, can be easily resealed to retain freshness.

Bulk, "loose" forms of herbal teas are also ideal because their leaves are more fragile than those of traditional teas, and hence less susceptible to bagging. Herbal teas are presently believed to be the fastest growing product in terms of tea market share.

A particular problem associated with bags of blended or mixed teas is shelf life. Because particular teas or herbs may go stale faster than the remainder of the bag contents, the shelf life of the entire product is tied to the shelf life of the least stable ingredient. If flavoring agents or flavoring augmenters were available that could be used with existing teas having longer shelf life, then the shelf lives of the composite products could be effectively extended without excessively burdening the inventory or stock keeping process. Ensuring freshness of the entire beverage product and thereby maximizing flavor is always desirable, especially in a "gourmet" market.

In contrast to bagged teas, bulk or "loose" teas can be separately identified and kept in bins or jars from which the unique beverages can be custom blended "to taste" by each retailer to the order of a particular customer.

The growth of "herbal" teas which are of variable strength in relation to other teas, the growth of flavored teas, and the use of flavoring agents in tea such as spices and dried fruits, all argue strongly for having teas and their flavoring agents available in bulk quantities for custom blending "to taste" at the brewing site, especially for take-out customers. From the above, it is clear that a tea infuser of a proper design, i.e., a container for tea leaves in a cup or other brewing container, would serve many needs of tea retailers and consumers.

Besides tea, there are other hot beverages that can benefit from an infuser of proper design. For example, flavored coffees are quite popular, but must be made and served in quantity rather than to a customer's individual taste. Another example is the Asian hot milk based beverage known as "chai," whereby hot milk is flavored with cinnamon, pepper, ginger, crushed or shredded spices, herbs, and/or other flavoring agents. The use of a device that would enable such flavors to be added to hot milk on a custom basis would have a widespread appeal to chai fanciers, a rapidly-growing segment of the "gourmet" beverage market.

A properly-designed infuser would also facilitate the making of iced tea. An ideal situation would be to enable extremely hot water to be passed over a source of loose, fresh tea leaves custom-blended "to taste" in the infuser, sterilizing the leaves and extracting flavor almost instantaneously before being mixed with ice in the cup to achieve cooling. According to the invention, an infuser capable of simplifying the preparation and serving of iced tea is provided, and this infuser achieves other advantages as well.

Referring now to other advantages that might be gained by infusers of proper design, it would be advantageous if a permeable infuser could be made that would serve as a baffle below the surface of the liquid in the cup, thus preventing undesired "sloshing" of the beverage. Another advantage of an ideal infuser would be the ability to position tea leaves in such a way that, after the liquid level in the cup were lowered slightly, the strength of the beverage would not continue to increase, all without the risks of removing or repositioning the lid.

Still further, with products including coffee but primarily tea, wherein vapor phase flavor is inhaled by the user, a combination cover and infuser with an opening or recess to accommodate the nose of the user could favorably augment the apparent flavor of the product. In an ideal infuser, the wet, swollen, spent leaves might also serve as something analogous to a plug to augment the flavor of the liquid by sealing the container against loss of heat and volatile constituents.

Regarding the matter of serving tea for on-premises consumption or take out use, the so-called "gourmet" convenience coffee shops are confronted with difficulties not applicable to coffee. Thus, while a large pot of coffee can be brewed and many customers can be served from a common pot of large size, a principal advantage of tea is that the user may choose from a large number of flavors. This and the nature of the brewing process generally militate against keeping a large quantity of already-brewed tea on hand.

An ideal circumstance would be one wherein "loose" teas, "herbal" teas, and/or flavoring agents could be sanitarily placed in an exactly desired amount or proportion, as by a scoop or the like, into an infuser which could be associated with a cup into which extremely hot water could be added by passing over the leaves. This would enable the consumer to allow flavor to develop for the requisite time period and thereafter either remove the tea leaves and discard them without dripping, or lower the water/beverage level to isolate the tea from the water and thus terminate flavor build-up or change. Under further idealized conditions, the user could begin to sip the tea from the container for sampling purposes and thereby automatically remove the tea leaves from the liquid by lowering its level in the cup rather than by removing a bag or any auxiliary equipment.

SUMMARY OF THE INVENTION

This application is directed to an improved filter portion of an infuser for making beverages. The filter portion includes openings and associated tabs. The filter may include holes, slots or x-shaped openings. The openings may also be shaped like stars or the like. It is preferred that the openings or holes are formed in a manner which leaves no flash or excess material.

The invention is also directed to a method of making an infuser for beverages including a filter portion comprising openings, holes or the like. The openings may be formed by a shearing tool applied in a step subsequent to the molding of an infuser blank. The holes may be formed by needles or knife-shaped protrusions in a single step vacuum molding process.

In view of the failure of the prior art to provide a tea infuser having the above-described desirable characteristics, it is an object of the present invention to provide an improved infuser for tea or the like beverages.

Another object of the invention is to provide an infuser which is capable of being manufactured reliably at low cost.

It is another object of the present invention to provide an improved infuser having a perforated well or pocket, preferably centrally located, having a plurality of holes or openings formed therein.

It is another object of the invention to describe a filter portion of an infuser having openings formed therein, the openings having associated tabs and a method of forming the openings and tabs.

It is another object of the invention to describe a filter portion of an infuser having holes formed therein and a method of forming the holes.

The foregoing and other objects and advantages of the invention are achieved in practice by providing a disposable, low cost infuser for removable association with a drinking container wherein the infuser includes a body preferably having a container attachment portion such as a ribbed or beaded skirt, an upper, generally annular surface with a drink-through area in its outer margin, and further including a well or pocket portion with an open top, permeable walls extending sufficiently downwardly into an associated container so that the lower portions of the well lie initially below, and as the beverage is consumed, just above, the top surface of the liquid beverage.

The manner in which the foregoing and other objects and advantages are achieved in practice will become more clearly apparent when reference is made to the following detailed description of the preferred embodiments of the invention set forth by way of example and shown in the accompanying drawings wherein like reference numbers indicate corresponding parts throughout.

BRIEF DESCRIPTION OF THE DRAWINGS

FIG. 2 is a cross-sectional view of the infuser unit of FIG. 1.

FIG. 3 is a top view of the filter portion of an infuser well shown in approximately actual size.

FIG. 4 is an enlarged top view of FIG. 1 showing an embodiment of the shape and layout of the openings in the filter.

FIG. 5 is a side view of a portion of the shearing tool.

FIG. 6 is an enlarged cutaway side view of the filter portion showing the openings and associated tabs formed by the shearing tool.

FIG. 7 is a top view of the tab of FIG. 4.

FIG. 8 is a side view of another embodiment of the filter portion showing the openings and associated tabs in alternating relationship.

FIG. 9 is a top view of another embodiment of the filter.

DESCRIPTION OF THE INVENTION

Figure 1:
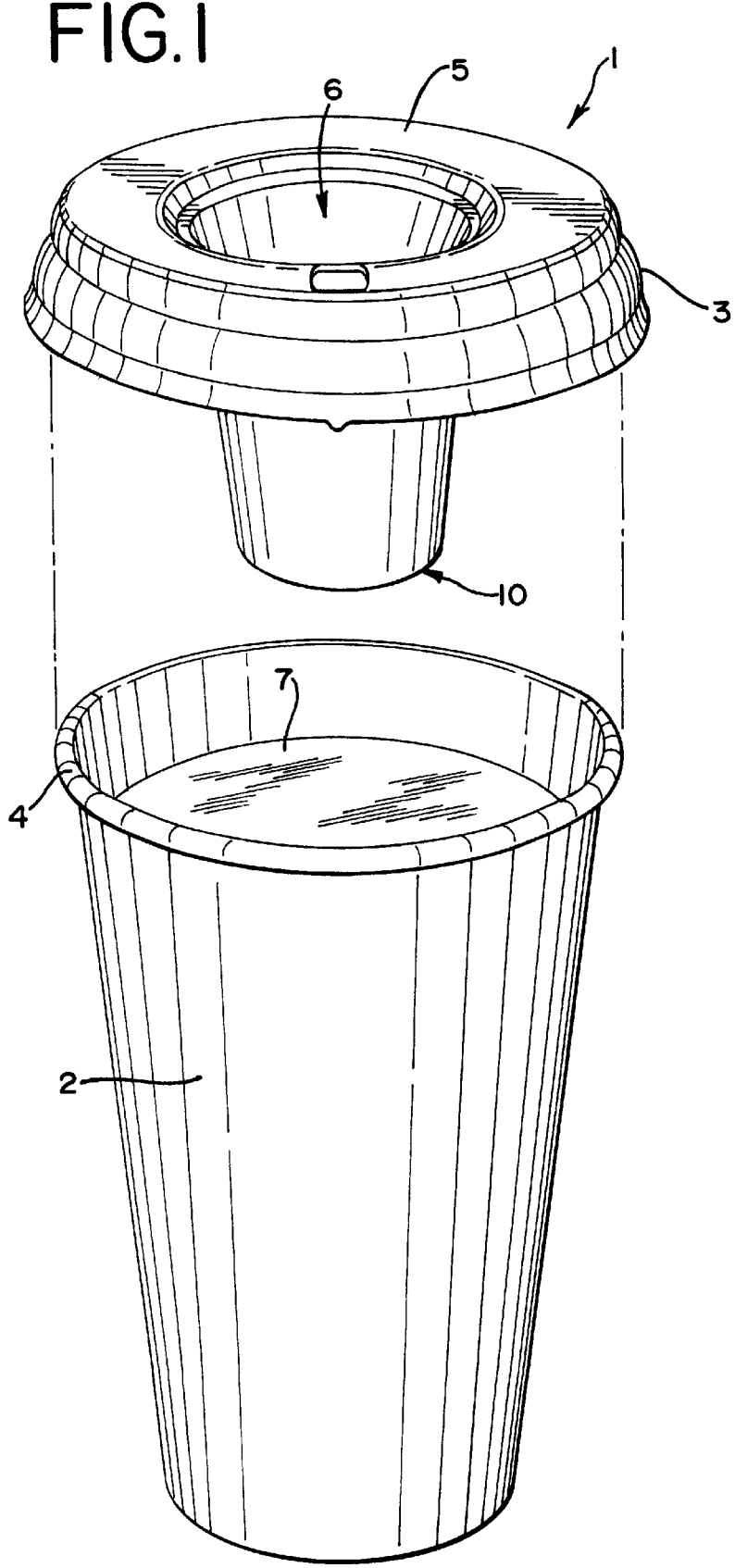
FIG. 1 is a perspective view of an infuser unit shown with an associated container.

While it will be understood that the invention may be embodied in somewhat different forms and that different materials may be used in the manufacturer of the preferred forms of product, a description will be given of a removable infuser (generally depicted in FIG. 1) with an improved filter portion which is intended for association with a disposable drinking cup of moderate capacity, such as 8–20 ounces, and wherein most or all of the infuser is made from a thermoformed sheet plastic material.

Referring now to the drawings in greater detail, FIG. 1 shows, generally, a removable infuser 1 and an associated container 2. The infuser 1 attaches to the container 2 by way of the container attachment portion 3 which provides a liquid-tight seal to the rim 4 of the container. An annular cover panel portion 5 extends radially inwardly from the attachment portion 3. The well 6 extends downwardly from the center of the annular cover panel 5. When the infuser is attached to an empty container and liquid is poured through the infuser, or when the infuser is attached to a container filled with liquid 7, the bottom of the well 6 is immersed below the surface of the liquid. Perforations in the filter portion 10 of the well (shown in FIG. 2) allow liquid to circulate through the well and contact any contents therein.

FIG. 2 is a cross sectional view of the infuser shown in FIG. 1. The infuser 1 is shown attached to a container 2. An annular cover panel portion 5 extends radially inwardly and defines the top of the well portion 6. The well 6 extends from the cover panel portion 5 downwardly from the center of the panel 5. The well 6 contains tea leaves 9, or the like. The liquid 7 in the container 2 is shown at a level which allows liquid 7 to enter the well through filter portion 10 through holes in the filter portion which are described in detail in the following description.

FIGS. 3 and 4 show a top view of the filter portion 10 of an infuser. The filter portion 10 is located in the well of an infuser, preferably in the flat bottom wall. The filter portion 10 is a round disc-shaped bottom portion of the well and contains a plurality of openings 12. The openings 12 in the preferred embodiment are half-moon shaped or semi-circular. The openings 12 may also be squared-off, pointed or the like. The filter portion in FIG. 2 is approximately actual size; measuring about 2 inches in diameter. The filter portion in FIG. 4 is shown about twice normal size.

FIG. 5 is a portion of a shearing tool 28 for forming the openings in the filter. It has a lower and an upper portion 20, 22. Lower portion 20 has male cutting portions or teeth 26 formed thereon which extend upwardly. Teeth 26 are essentially ramp-shaped in cross-section. What is not shown in FIG. 5 is that the teeth are semicircular in top view to create the semicircular openings discussed in more detail below. Recessed receiving portions or indentations 24 are formed into the top portion 22 of the tool opposite teeth 26 and are shaped to receive teeth 26 of bottom portion 20.

The tool 28 creates a filter portion 10 of the infuser when the plastic filter blank is inserted between lower and upper tool portions 20, 22 in a horizontal orientation. Bringing the tool portions together in a stamping operation vertically causes openings to be formed by shearing of the teeth through the plastic infuser blank without creating any "scrap" that would be otherwise need to be removed and discarded in the manufacturing process, unlike for example, a round, punched hole.

FIG. 6 is a cross-section of the filter created by the tool of FIG. 5 As described above, opening 12 is formed by shearing tool 28. Tab 30 remains attached to the filter as a remnant of the opening forming process. Tab 30, therefore, is a semicircular flap having semicircular edge 34 where it has been cut away from the filter blank and straight attached edge 36 where the tab remains attached to the filter blank. In this example, multiples of tab 34 are all angled upwardly.

Opening 12 allows liquids to enter and exit the infuser well. Tab 30 functions to keep tea leaves and the like from blocking opening 12. Again, a further benefit of this method of forming openings in the infuser filter is that by retaining the tab on the filter, no waste, known as flash, is generated in the manufacture of the filter portion of the infuser.

FIG. 8 is a cutaway side view of another embodiment of the present invention. Filter 10' has openings 12 formed similarly to those in FIG. 6 and 7, however, tabs 30, 301 alternate in an up and down fashion. The shearing tool to make filter 10' would have teeth and indentations formed in an alternate fashion accordingly.

FIG. 9 is a top view of an alternate embodiment of a filter portion of an infuser. Filter 40 has holes 42 formed therein. Filter 40 is formed at the same time the infuser is thermoformed by having needle-shaped or knife-edged protrusions in the filter forming area of a mold. Thermoplastic is injected or introduced into a mold and preferably vacuum formed down into the mold. The protrusions in the bottom of the mold in a filter-forming portion of the mold cause holes to be formed in the filter portion of the infuser. This single-pass method of manufacturing the infuser is efficient and, again, no flash is produced when creating the holes in the filter portion of the infuser.

In some preferred embodiments, the infuser unit comprising the filter portion of the present invention is made from a thermoformable plastic material such as a styrene containing copolymer. Preferably, the thickness of the material as formed is about 0.010–0.015 inches. Depending on the forming method, the thickness may vary somewhat throughout the product. The choice of polymer used depends on the exact application, with those skilled in the art being aware of the requirements for flexibility, overall stiffness, resistance to temperature extremes and optionally, colorability.

It will thus be seen the present invention provides a new and improved hot beverage infuser having a number of advantages and characteristics, including those pointed out herein and others which are inherent in the invention. Several preferred embodiments having been described by way of illustration, it is anticipated that modifications to the described forms of product will occur to those skilled in the art and that such modification and changes may be made without departing from the spirit of the invention.

What is claimed is:

1. An infuser unit for making beverages in an associated container comprising:

- a container attachment portion for removable association with the rim of an associated liquid container in snug, liquid-tight relation;
- an annular cover panel portion extending radially inwardly from said container attachment portion;
- a well for receiving a charge of beverage flavoring material, said well being defined by walls extending downwardly from said annular cover panel portion and to a position substantially beneath said container attachment portion;
- a filter portion located in said well, said filter portion being below the level of a liquid in said associated container;
- a plurality of openings formed in said filter portion to permit liquid circulation between the regions lying respectively inside and outside said well portion, said openings having at least one tab portion adjacent each of said openings, said tab being created from said filter portion during formation of said openings.

2. The infuser unit of claim 1 wherein said plurality of openings are semi-circular openings.

3. The infuser unit of claim 2 wherein each of said openings has one semicircular tab adjacent thereto.

4. The infuser unit of claim 1 wherein each said opening has at least one triangular tab adjacent thereto.

5. The infuser unit of claim 1 wherein each of said openings has a plurality of tabs adjacent thereto.

* * * * *